July 10, 1945.　　　　W. E. EDELMAN　　　　2,379,954

MOTOR OPERATOR

Filed March 2, 1942　　　　4 Sheets-Sheet 1

INVENTOR.
Walter E. Edelman
BY George H. Fisher

July 10, 1945.  W. E. EDELMAN  2,379,954

MOTOR OPERATOR

Filed March 2, 1942  4 Sheets-Sheet 2

INVENTOR.
Walter E. Edelman
BY George H. Fisher

Fig.13

Patented July 10, 1945

2,379,954

UNITED STATES PATENT OFFICE 2,379,954

MOTOR OPERATOR

Walter E. Edelman, Minneapolis, Minn., assignor to Minneapolis-Honeywell Regulator Company, Minneapolis, Minn., a corporation of Delaware Application March 2, 1942, Serial No. 432,968

12 Claims. (Cl. 172—36)

This invention relates to motor operators for controlling dampers, valves, and the like devices, such as might be used in connection with air, steam, water, oil, and gas heating systems.

An object of the invention, generally, is to provide improvements in the details of construction and arrangement of parts of motor operators of this type.

Another object is to provide a motor operator of the type described having a minimum number of parts which readily may be assembled, and which may conveniently be disassembled for purposes of inspection and repair.

A further object of this invention is to provide a motor operator having a casing comprising a fixed and a removable portion, the fixed portion of which has means for mounting the same on a suitable support, such as a vertical wall, beam, or the like, and the removable portion of which serves as a mounting base for the operating and control parts of the motor operator, whereby the removable casing portion together with the operating and control parts may be removed from the fixed casing portion without necessitating the severance of electrical connections, disassembly of operating parts, or removal of the fixed casing portion from its operative position.

It is a further object of this invention to provide a motor operator having a casing comprising a fixed and a removable portion in which the removable portion serves as a mounting base for the operating and control parts, including a panel, of the motor operator, and in which a part of the fixed casing portion is shaped so as to interfittingly receive the panel whereby the panel is readily accessible for making external electrical connections therewith and is conveniently removable from the fixed casing portion together with the removable casing portion without necessitating the severance of either external or internal electrical connections therewith.

A further object of this invention, in which a motor operator is provided having a casing comprising a fixed and removable portion, is to utilize each casing portion as a journal for the operating shaft of the motor operator, the operating shaft extending beyond the casing portions, but being removable from the fixed casing portion together with the removable casing portion and the other motor operator parts, including the panel, supported thereon.

An additional object of this invention is to provide improvements in the details of construction of operator arms for operating shafts which may be removably, but securely, mounted thereon.

Another object is to provide, in a motor operator of the type described, means whereby the ends of the motor windings may be secured to convenient parts of the motor and fastened directly to the panel thereby providing a motor operator requiring but a minimum number of internal connections to effect its operation for the purposes intended.

Other objects are to provide, in a motor operator of the type described, novel combinations and arrangements of the switch means and actuating means therefor whereby a plurality of such switch means may be depended from a single panel and actuated by a single element carried by the operator shaft thereby providing a compact assembly occupying but a minimum of space.

Still other objects are to provide, in a motor operator of the type described, novel combinations of switch means and acuating parts therefor which are secured thereto in a simple and expeditious manner.

Still further objects are those implied or inherent in all other combinations, constructions, and arrangements of parts hereinafter specifically illustrated, described, and claimed, reference being had to the accompanying drawings in which

Figure 1:
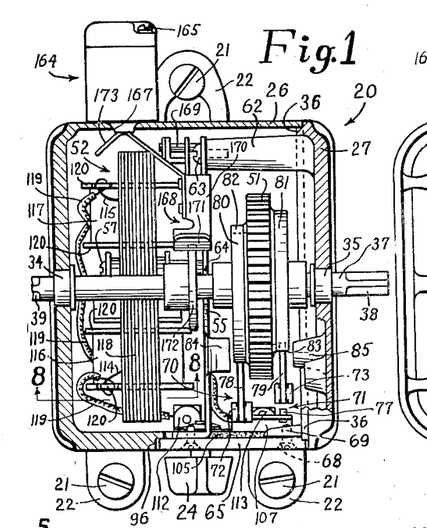
Figure 1 is a sectional view of the motor operator as viewed along the lines 1—1 of Figure 2, looking in the direction of the arrows.
Figures 2, 8:
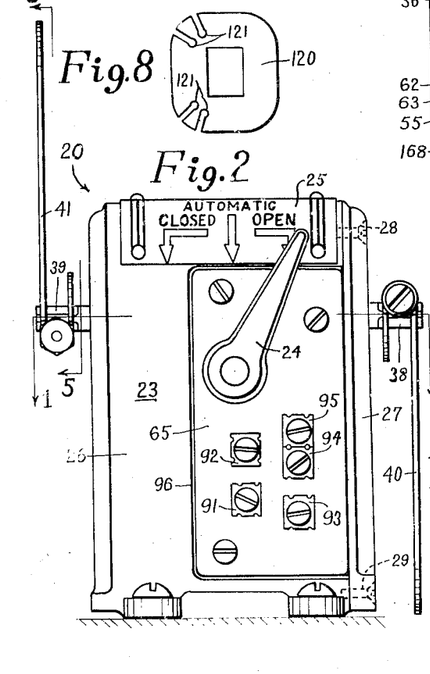
Figure 2 is a view of the motor operator as viewed from a position beneath the same as shown mounted on a vertical wall in Figure 1.
Figure 8 is a view of a winding insulation piece shown as viewed along the lines 8—8 of Figure 1.
Figure 3:
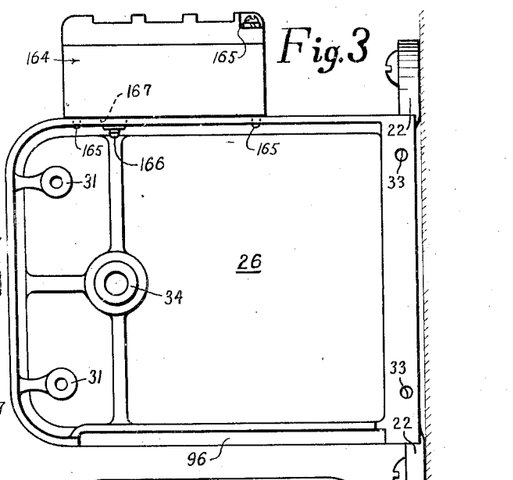
Figure 3 is an inside view of the fixed portion of the motor operator casing.

Referring to Figures 1 to 9, the numeral 20 generally designates a motor operator which in Figures 1 and 3 is shown mounted on a vertical wall by means of suitable screws 21. The screws 21 are received in apertured ears 22 which are formed integrally with the motor operator casing generally designated by the numeral 23. The motor operator is mounted approximately at eye level in which position it appears as shown in Figure 1. In this position a manual control lever 24 conveniently may be adjusted in accordance with the legends inscribed upon a plate 25, as shown in Figure 2, wherein the motor operator appears as viewed from a position beneath the same as shown in Figure 1.

Figure 4:
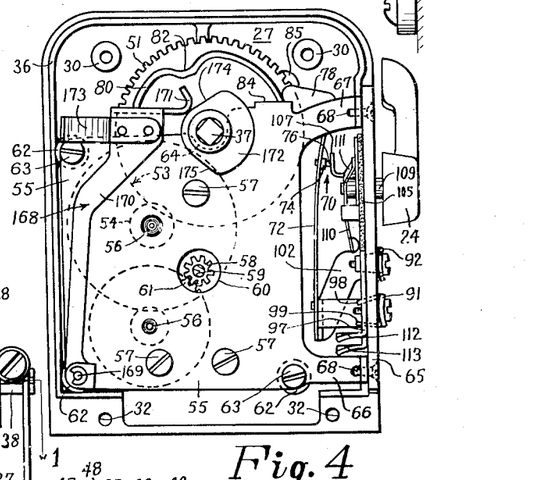
Figure 4 is an inside view of the removable portion of the motor operator casing showing the operator parts supported thereon, the motor being removed to better illustrate the remaining parts.

The casing 23 comprises a generally box-shaped portion 26, and a cover portion 27 removably secured thereto by means of screws 28, 29. The screws 28 extend through apertured bosses 30 formed integrally with the cover portion 27 and are received into threaded apertures provided in bosses 31 formed integrally with the casing portion 26 and extended the full depth thereof. Screws 29 similarly enter apertures 32 formed in the base of the cover portion 27 and are received into threaded apertures 33 provided in the base of the casing portion 26. It here should be pointed out that the mounting ears 22 are formed integrally with the casing portion 26, and that the control and operating parts of the motor operator are supported entirely by the cover portion 27 as hereinafter to be described. Thus, the cover portion 27 may be removed from the casing portion 26 which remains in its mounted position as shown in Figure 3. The inside of the cover portion together with the parts supported thereon then appears as shown in Figure 4. In this figure, however, the motor has been omitted to better illustrate the other parts. Accordingly, hereinafter the casing portion 26 will be referred to as the fixed casing portion, and the cover portion 27 will be referred to as the removable casing portion.

The casing portions 26, 27 each have pressed therein a sleeve bearing 34, 35 respectively. To insure alignment of the bearings 34, 35 and to facilitate the ease of assembly of the casing portions 26, 27, a flange 36 is formed integrally with the removable casing portion 27 which extends into the fixed casing portion 26 as best shown in Figure 1.

An operating shaft 37 is journalled in the bearings 34, 35 and projects beyond them on each side of the casing, each projecting end of the shaft having a squared portion 38, 39 for receiving an operating arm 40, 41 respectively.

Figure 5:
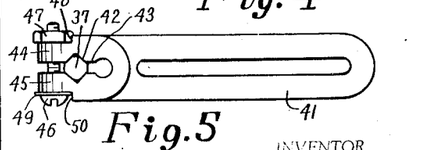
Figure 5 is a view of an operator arm as viewed along the lines 5—5 of Figure 2, looking in the direction of the arrows.

Arms 40, 41 may be identical, each being substantially J shaped and having a pair of aligned apertures 42 formed therein for receiving the squared portions of the shaft 37, the apertures for this purpose being squared as shown in Figure 5. The apertures 42 are elongated to each side thereof forming a slot 43 which extends through the bight portion of the arm thereby bifurcating the arm and providing furcations 44 and 45 which may be drawn together to clamp the arm to the shaft. For this purpose a machine screw 46 is used which extends along the bight portion of the arm between the same and the shaft. The screw carries a nut 47 seated in an indentation 48 which serves to hold the same in non-turnable relation with respect to the arm and a washer 49 similarly seated in an indentation 50 which serves to center the screw 46 between the shaft and the bight portion of the arm.

From the foregoing it is obvious that I have provided a novel, simple, and extremely effective means for removably securing the operating arm of a motor operator to its shaft since the squared shaft portion and cooperating squared apertures in the arm not only provide a mutual locking engagement but the provision of the clamping means serves to prevent all possibility of relative rotation between them as well as serves to hold the arm against axial movement with respect to the shaft.

Operating shaft 37 carries a gear 51 which is suitably mounted thereon for rotation therewith. Shaft 37 is driven by a motor generally designated 52 through a suitable gear train generally indicated by the numeral 53 of which a pinion 54 operatively makes engagement with the gear 51, as shown in Figure 4. The gear train 53 is mounted for rotation between the removable casing portion 27 and a plate 55 supported thereon, being journalled therebetween in any suitable manner. In the arrangement shown in Figure 4, the several gears comprising the gear train 53 are separately mounted for rotation on pins 56 which on one end are staked to the plate 55 and on the other end are received in suitable sockets, not shown, provided in the removable casing portion 27.

The motor 52 is conveniently mounted on the plate 55 by means of suitable screws 57 in such a manner that a pinion 58 secured to the motor shaft 59 extends through an aperture 60 in the plate 55 to operatively engage a first gear 61 of the gear train 53.

The plate 55 is supported on three posts 62 formed integrally with the removable casing portion 27, one of which appears in profile in Figure 1, and is secured thereto by suitable screws 63. It will be noted that an indentation 64 is provided in plate 55 for receiving the shaft 37 which, consequently, is supported only in the widely spaced bearings 34, 35 which are advantageously disposed adjacent the operating arms 40, 41 to which the load is connected. It will be further noted that the gear 51 is disposed between the plate 55 and the removable casing portion 27. Accordingly, the shaft 37 and gear 51 are removable from the fixed casing portion 26 together with the removable casing portion 27 and the parts supported thereon simply by removing the arm 41 and permitting the shaft 37 to slip through the bearing 34.

Supported on the plate 55 and the removable casing portion 27 is a panel 55. The plate has a pair of extensions 66, 67 each having a turned up end provided with a threaded aperture for receiving a mounting screw 68 by means of which the panel 65 is secured to the plate 55. The removable casing portion 27 has an integrally formed ear 69 also provided with a threaded aperture for receiving a third mounting screw 68 by means of which the panel is secured to the casing portion 27.

Depending from the panel 65 are a pair of switches 70, 71 which may be identical, each having a resilient switch blade 72, 73, a movable contact 74, 75 carried thereby, a fixed contact 76, 77 engageable by the movable contact, and a cam follower 78, 79 removably secured to the switch blades 72, 73, respectively. (See Figures 1, 4, 6, 7 and 12.)

When the panel is in position the switches 70, 71 each depend on opposite sides of the gear 51. The resilient blades 72 and 73 are self-biased so as to hold the followers 78 and 79 in engagement with cams 80 and 81 formed integrally with and extended axially of gear 51, as best seen in Figure 1. The cams 80, 81 have formed therein diametrically opposed indentations 82, 83 respectively, which when radially aligned with the cam followers 78, 79 permit the same to move radially to open the switches 70, 71 respectively. It will be understood that the motor 52 is a well known type capable of driving the shaft 37 in one direction, and that the switches 70 and 71 are inserted in the circuit for energizing the motor for the purpose of limiting the operation thereof to 180° per operation, each switch serving upon the opening thereof to terminate the operation. Such motors are conventionally used in control systems wherein each 180° position of the shaft 37 corresponds to a controlled condition of a furnace, for example, in which the check damper is opened and the draft damper is closed in one position and the check damper is closed and the draft damper is opened in the successive 180° position, the check and draft dampers being suitably connected to diametrically opposed operating arms such as arms 40, 41 shown in Figure 2. Accordingly, when the motor is stopped one switch is closed and the other is open, and when the motor is operating both switches are closed since the contacts are yieldably urged into engagement by the force of the cams 80, 81 on the cam followers 78, 79 respectively. As will hereinafter appear this force is ineffective to disengage the cam follower from the novel locking engagement with its supporting switch blade. To prevent the cam followers 78, 79 from sliding axially off of the cams 80, 81 and thereby becoming disengaged therefrom, an ear 84 on plate 55 is bent at right angles and extends adjacent to the cam 80 and a boss 85 formed integrally with the removable casing portion 27 is extended adjacent to the cam 81, as best shown in Figure 1.

Figures 6, 10:
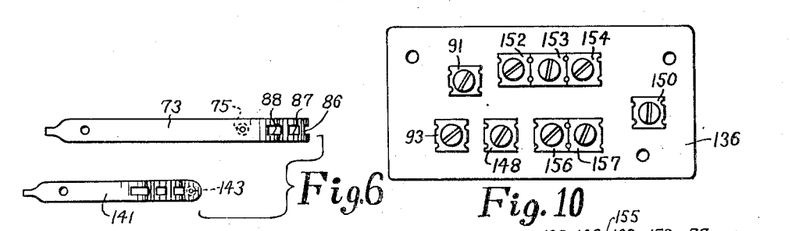
Figure 6 illustrates the details of construction of the switch blades.
Figure 10 is an outside view of a modified panel assembly.
Figures 7, 9, 11, 12:
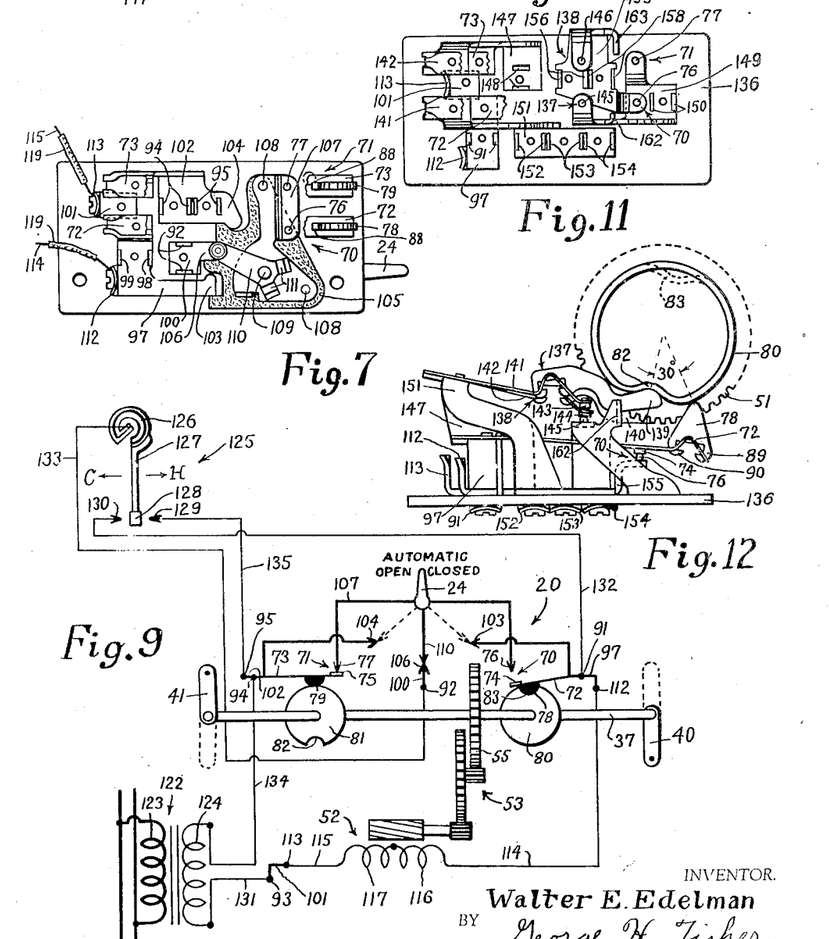
Figure 7 is an inside view of the panel assembly, certain parts being broken away for greater clarity.
Figure 9 is a schematic view of a control circuit for a heating system which utilizes the motor operator as a part thereof.
Figure 11 is an inside view of the modified panel.
Figure 12 is an elevational view of the modified panel.

Referring to Figures 6 and 12, it will be seen that the free end of each switch blade 72, 73 is bent into a substantially inverted V shape, and that squared apertures 86, 87 and 88 are formed therein at the free end, vertex, and attached end of the V respectively. The apertures 86, 88 receive hook-shaped tips 89, 90 formed integrally with each cam follower 78, 79, and the aperture 87 receives the portion of the cam follower between the tips. In assembling the cam follower and spring blade, the tip 90 is first inserted in the aperture 88. Pressure is then applied forcing the free end of the V to bend about the vertex thereof in a direction to close the open end of the V until the tip 89 snaps into the aperture 86 thereby locking the cam follower to the blade, the aperture 87 serving to hold the same securely in locked engagement. It will be noted that the aperture 88 is elongated to accommodate the tip 90 as the cam follower moves longitudinally of the blade with the bending movement of the free end of the V about the vertex thereof. In removing the cam follower from the blade, the foregoing procedure must be repeated in reverse. In other words, the cam follower can be removed from the switch blade only by first applying a force to the tip of the switch blade in a direction to close the open end of the V. Accordingly, the cam followers cannot be removed by the action of the cams which action produces a flexing of the switch blades about their fixed ends only. The cam followers are formed of insulation material to prevent a flow of current between the switches 70, 71 through the gear 51 when both switches are closed, as will be readily understood. The switch blades 72, 73 may be formed of any suitable resilient metal or electrical conductive material, preferably of Phosphor bronze.

Referring to Figure 2, a plurality of terminals 91, 92, 93, 94 and 95 are shown mounted on the panel 65 which may be formed of any suitable insulating material such as Bakelite or the like. Each terminal includes a binding screw by means of which the necessary electrical connections for the motor operator may be made with the terminals. It will be noted that an indentation 96 is provided in the fixed casing portion 26 to receive the panel 65. The shape of indentation 96 corresponds substantially to the shape of panel 65. Thus, the panel, in effect, also serves as a part of the casing of the motor operator and electrical connections readily may be made therewith without necessitating a disassembly of the casing.

The terminal 91 has fingers 98, 99 formed integrally therewith which extend through the panel 65 to grip a conductor piece 97 disposed on the opposite side thereof, as best shown in Figure 4. The terminals 92, 93 and 94 are similarly secured to conductor pieces 100, 101 and 102, respectively. Terminal 95 is also secured similarly to contact piece 102.

Referring now to Figures 4 and 7, it will be seen that the conductor contact pieces 97 and 102 serve as supports for the switch blades 72 and 73, respectively, and that they have contact portions 103, 104, respectively, which are received in indentations formed in a plate of insulating material 105 secured to the panel 65 for the purpose of holding the conductor pieces 97 and 102 securely in position. The conductor piece 100 similarly has a contact portion 106 which is also received in an indentation formed in the insulation plate 105. The fixed contacts 76, 77 are supported on a common conductor piece 107 mounted on the insulation plate 105 and secured therewith to the panel 65 by means of rivets 108. The manual control lever 24, hereinbefore referred to, is secured for rotation with a pin 109 which is journalled in the contact piece 107. The pin also carries a resilient switch blade 110 which resiliently engages the conductor piece 107, the blade 110 having turned down fingers 111 which serve for this purpose. The blade 110 is engageable with the contact portions 103, 104, and 106 selectively when the manual control lever is adjusted in accordance with the legends on plate 25. A circuit for energizing the motor 52 may be completed by an external controller, such as a thermostat, for example, through either of the switches 70, 71 when the lever 24 is adjusted to the "automatic" position thereby moving blade 110 into engagement with contact portion 106. A circuit is completed through the switch 70 when lever 24 is adjusted to the "closed" position. A circuit is completed through the switch 71 when lever 24 is adjusted to the "open" position. These circuits will be hereinafter explained in connection with the operation of the motor operator as utilized in a heating system.

The conductor pieces 97 and 101 have turned up portions 112 and 113 comprising terminals each of which carries a binding screw by means of which the ends 114, 115 of motor windings 116, 117 are secured to the conductor pieces 97 and 101, respectively.

Referring to Figure 1, it will be seen that the windings 116 and 117 are conveniently arranged on the motor core 118. As shown, the core 118 is of the window type in which the field coils are wound on pole pieces 118a, which together with the armature comprise a central magnetic path for the motor.

Figure 13:
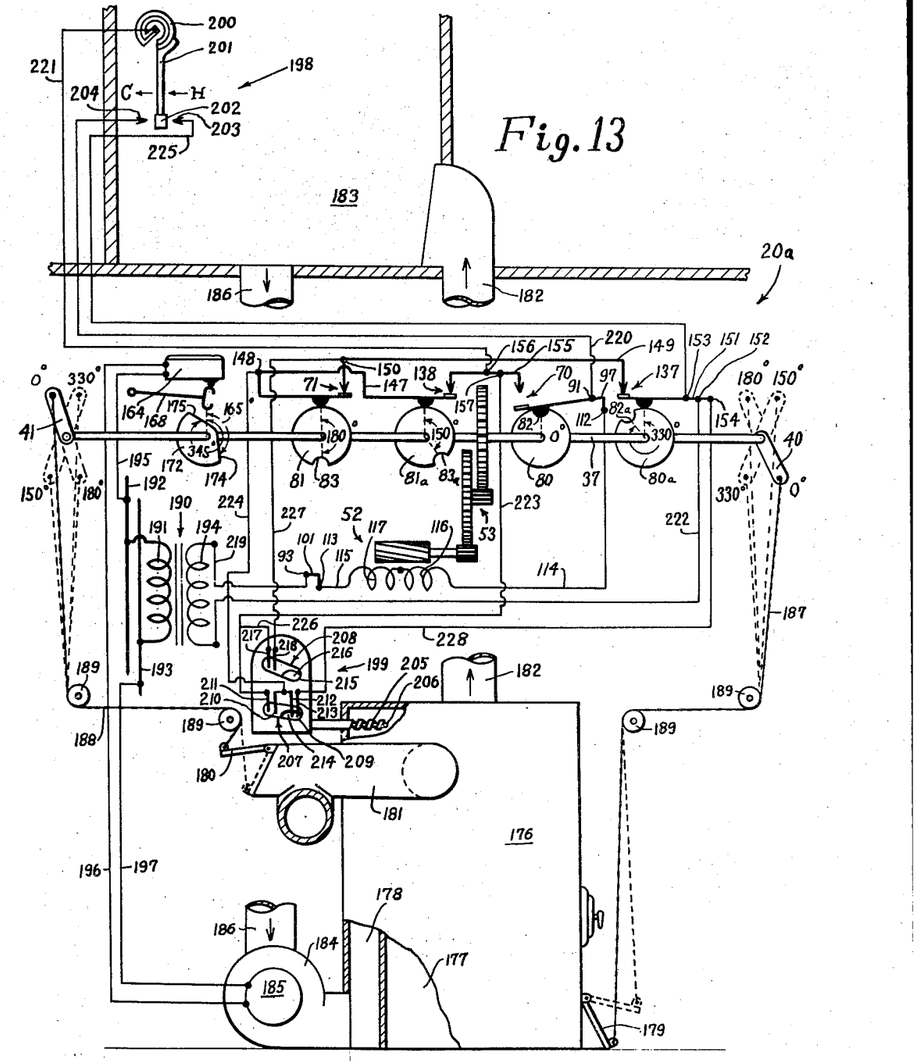
Figure 13 is a schematic view of a condition control system which utilizes the modified form of the motor operator as a part thereof.
Figure 14:
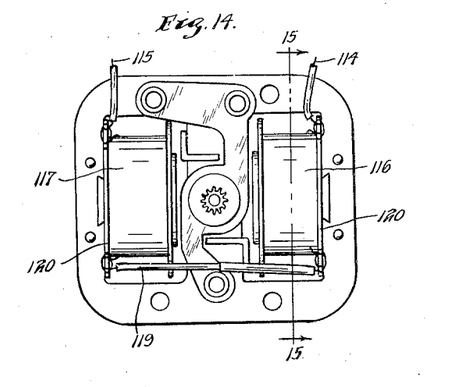
Figure 14 is an elevational view of the motor, showing parts associated therewith, of the improved device.
Figure 15:
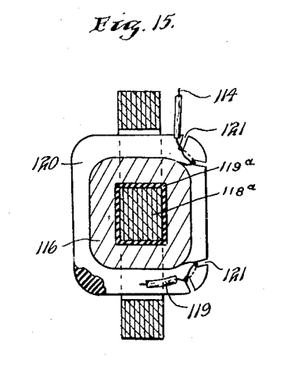
Figure 15 is a sectional view taken on line 15—15 of Figure 14, looking in the direction indicated by the arrows.
Figure 16:
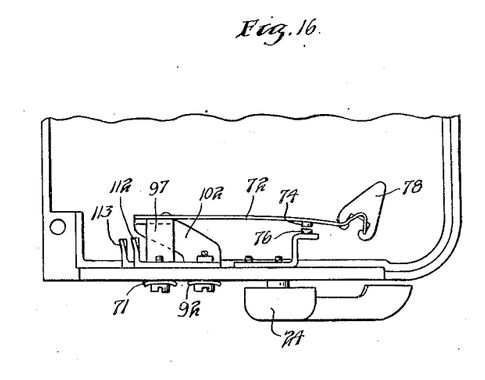
Figure 16 is an elevational view of the panel assembly of the embodiment shown in Figures 1–4.

The windings 116, 117 are series connected as is clearly shown in Figures 9, 13 and 15 and each comprises many turns of wire. A piece of tubular insulation 119 is employed to cover the joined terminals of the two windings. Each winding 116, 117 is wound upon an insulation piece 119a, which is folded about the pole piece 118a as is best shown in Figure 15. The end insulation pieces 120 are positioned over the folded insulation pieces 119a, as is best shown in Figure 15, closely adjacent the ends thereof to prevent their unfolding and thus serve to hold the same in position on the core. At least one insulation piece 120 of each winding is provided with two pairs of apertures 121 which are extended to an edge of the insulation piece as best shown in Figure 8. Adjacent the free end of each winding 116, 117, the wire is wound with one or more turns about the portion of the insulation piece 120 defined by the apertures 121. The projecting portions of the wire are covered with pieces of tubular insulation 119, and the ends 114, 115 thereof are secured to the terminals 112 and 113 as previously described. Thus, by this arrangement the windings are securely held upon the motor core 118 and but two internal connections are required to electrically connect the motor with the panel thereby promoting economy of construction and facilitating ease of assembly of the motor operator parts. Moreover, since the panel 65 and motor 52 are both supported on the removable casing portion 27, they may be removed therewith from the fixed casing portion 26 without necessitating the severance of electrical connections therebetween which is obviously a decided advantage in disassembling the operator for purposes of inspection and repair.

From the foregoing, it is apparent that the casing portions 26, 27 may be advantageously provided in the form of castings, thereby obviating a time consuming assembly of a plurality of parts. Each casting comprises, besides the casing itself, integrally formed parts which perform other functions, as for example, the posts 62, etc. The casing portions 26, 27 are preferably cast, for example, of zinc or other suitable metals, but may be moulded of Bakelite or other suitable plastics, if so desired. While castings are preferred as best suited for the purposes of this invention, their use is not indispensable, and other means of fabrication well known in the art may be resorted to if desired.

Referring now to Figure 9, the motor operator 20 is schematically shown as employed in a heating system, the parts previously described being designated by the same reference characters.

The numeral 122 generally designates a transformer having a primary winding 123 connected to a suitable source of A. C. power, not shown, and a secondary winding 124 for energizing the motor 52.

The numeral 125 generally designates a thermostat, which as shown, is of a conventional single-pole double-throw type, comprising a bimetallic strip 126, a switch blade 127 secured thereto and movable thereby, a movable contact 128 carried by the blade 127, and a pair of fixed contacts 129 and 130 engageable by the movable contact. It will be understood that the thermostat is situated in a space heated by a furnace, the draft and check dampers of which are connected to the operator arms 40 and 41 respectively, and controlled by the motor operator 20.

In the operation of Figure 9, with the parts in their full line positions as shown, the switch blade 110 is adjusted for automatic operation in which position the thermostat 125 is in control of the motor 52, the operator arm 40 is in a down position in which position the draft damper is closed, the arm 41 is in a raised position in which the check damper is open, and the switch 70 is open.

When the temperature in the space drops, the bimetallic strip 126 moves the blade 127 in the direction of the legend C and the contact 128 engages the contact 130 completing a circuit to the motor 52 as follows: from secondary winding 124, through a conductor 131, terminal 93, conductor piece 101, motor terminal 113, winding lead wire 115, windings 117, 116, winding lead wire 114, motor terminal 112, conductor piece 97, terminal 91, a conductor 132, contacts 130, 128, switch blade 127, bimetallic strip 126, a conductor 133, terminal 92, conductor piece 100, contact portion 106, switch blade 110, conductor piece 107, switch 71, switch blade 73, conductor piece 102, terminal 94, and through a conductor 134 back to secondary winding 124.

The motor 52 then drives the shaft 37 for one half a revolution whereupon the switch 71 is opened and terminates further operation. In this position the operating arms 40 and 41 occupy their dotted line positions which correspond to a controlled condition of the furnace in which the check damper is closed and the draft damper is open. The furnace then operates to supply heat to the space until the temperature has reached a predetermined value as determined by the differential of the thermostat 125. The strip 126 then moves the blade 127 in the direction of legend H and contact 128 engages contact 129.

A circuit is then completed to motor 52 as follows: from secondary 124, through conductor 131, terminal 93, conductor piece 101, motor terminal 113, winding lead wire 115, windings 117, 116, winding lead wire 114, motor terminal 112, conductor piece 97, switch blade 72, switch 70, conductor piece 107, switch blade 110, contact portion 106, conductor piece 100, terminal 92, conductor 133, strip 126, blade 127, contacts 128, 129, a conductor 135, terminal 95, conductor piece 102, terminal 94, and through conductor 134 back to secondary winding 124. The motor 52 then operates for another one half a revolution of the shaft 37 thus returning the arms 40 and 41 to their initial full line positions.

At a time when the draft damper is closed and the check damper is open, it may be desired to open the draft damper and close the check damper independently of the thermostat 125. For example, such a movement of the dampers might be needed during stoking of the furnace. In order to do this, the control lever 24 may be moved to the "open" position which completes a circuit to the motor as follows: from secondary winding 124 through 131, terminal 93, conductor piece 101, motor terminal 113, winding lead wire 115, windings 117, 116, winding lead wire 114, motor terminal 112, conductor piece 97, contact portion 103, switch blade 110, conductor piece 107, switch 71, conductor piece 102, terminal 94, and conductor 134 back to secondary winding 124. As previously pointed out, the motor then operates until the switch 71 opens which corresponds to the draft damper open, check damper closed condition.

On the other hand, at a time when the draft damper is open and the check damper is closed, it may be desired to close the draft damper and open the check damper. If so, the control lever 24 may be moved to the "closed" position which completes a circuit to motor 52 as follows: from secondary winding 124, through conductor 131, terminal 93, conductor piece 101, motor terminal 113, winding lead wire 115, winding 117, 116, winding lead wire 114, motor terminal 112, conductor piece 97, switch 70, conductor piece 107, switch blade 110, contact portion 104, contact piece 102, terminal 94, and conductor 134 back to secondary winding 124. As previously pointed out, the motor then operates until the switch 70 opens which corresponds to the draft damper closed, check damper open condition.

Figures 10, 11 and 12, show a switch assembly mounted on a panel 136 which is a modification of the panel 65 and the switch assembly shown in Figures 1, 2, 4 and 7. These panel and switch assemblies are made interchangeable in order that the motor operator 20 may be adapted to different control circuits.

As best shown in Figures 11 and 12, additional switches 137, 138 are provided in the plane of switches 70, 71 respectively, being mounted on the panel 136 in such manner that their respective cam followers 139, 140 engage the indentations 82, 83 approximately 30° behind the cam followers 78, 79 of switches 70, 71 respectively. Accordingly, taking the angular position of gear 51 in which switch 70 is open as a datum, it will be understood that the switch 138 will be opened after 150°, switch 71 after 180°, switch 137 after 330°, and switch 70 opened again after 360° of rotation of gear 51. The cam followers 139, 140 are formed of insulation material and are of a suitable angular configuration as illustrated in Figure 12, being provided with hooked tips for engagement with their respective switch blades 141, 142, as in the case of the connection between cam followers 78, 79 and their respective switch blades 72, 73. The switches 137, 138 further comprise movable contacts 143, 144 carried by switch blades 141, 142 and engageable with fixed contacts 145, 146, respectively.

The switch blades 73, 142 are supported on a common conductor piece 147 as shown in Figures 11 and 12, which is secured to the panel 136 by the terminal 148 in the same manner as previously described in connection with panel 65. The fixed contact 77 of switch 71 is, in this case, supported on a conductor piece 149 which also serves as a support for fixed contact 145 of switch 137, the conductor piece 149 being secured to panel 136 by a terminal 150. The switch blade 141 of switch 137 is supported on a conductor piece 151 which is secured to panel 136 by the terminals 152, 153, and 154. The fixed contact 76 of switch 70 is supported on a conductor piece 155 which also serves as a support for the fixed contact 146 of switch 138, the conductor piece 155 being secured to the panel 136 by the terminals 156 and 157. The switch blade 72, as in the case of panel 65, is supported on the conductor piece 97 which has the turned up portion 112 for electrical connection with the motor 52 as previously explained. Conductor piece 97, also as in the case of panel 65, is secured to panel 136 by the terminal 91. The conductor piece 101, which has the turned up portion 113 as used on panel 65 for making the other electrical connection with the motor 52, is similarly used on panel 136. Also, conductor piece 101 is similarly secured to panel 136 by the terminal 93.

From the foregoing it may be seen that the switches 70, 138, 71, 137 are connected in series as follows: beginning at terminal 91, through conductor piece 97, switch blade 72, contacts 74, 76, conductor piece 155, contacts 146, 144, switch blade 142, conductor piece 147, switch blade 73, contacts 75, 77, conductor piece 149, contacts 145, 143, switch blade 141, conductor piece 151 to terminal 152.

As seen in Figures 11 and 12, the conductor pieces 149 and 155 have inwardly turned ears 162, 163, respectively, which extend adjacent to the cam followers 139, 140 respectively, and serve to prevent the same from moving axially off of the cams 80 and 81, respectively.

Referring to Figures 1, 3, and 4, the numeral 164 generally designates an auxiliary switch of the self-return type in which a greater force is required to actuate the switch than to maintain it in its actuated position. Switch 164 may be substantially of the type as described in the copending application of Albert E. Baak, Serial No. 307,991, filed December 7, 1939.

As shown in Figure 3, switch 164 is conveniently mounted on the fixed casing portion 26 by means of suitable screws 165, and has an actuating button 166 projecting through an aperture 167 provided in the fixed casing portion.

The button 166 is actuated by a lever generally designated by the numeral 168 which is suitably pivotally supported on a pivot pin 169 secured to a post 62. The lever 168 comprises a rigid portion 170 having shaped on its free end a curved portion 171 which is yieldably forced into engagement with a cam 172, suitably secured to the operator shaft 37, by a resilient spring blade 173 riveted to the lever portion 170 and engageable with the actuating button 166.

The disposition of cam 172 on shaft 37 is such that it bears a definite circumferentially displaced relation with respect to the indentations 82, 83 in gear 51. Again taking the angular position of shaft 37, in which switch 70 is in its open position as a datum, the follower portion 171 of lever 168 engages the leading edge 174 of cam 172 after the shaft 37 has rotated approximately 165°, and engages the trailing edge 175 after approximately 345° rotation of shaft 37.

With the foregoing arrangement it will be apparent that the switch 164 will be actuated after 180° of movement of shaft 37 in which position the switch 71 is opened. It will still be actuated after 330° of movement in which case the switch 137 is opened.

The additional switches 137, 138 and the switch 164 may be used for the purpose of providing a cooperative action between the controls of a furnace, for example, the check and draft dampers of a hot air furnace and a fan for circulating the air warmed by the furnace, as will hereinafter appear in a description of the operation of the modified form of the motor operator as utilized in such a heating system.

Referring now to Figure 13, the modified form of the motor operator 20a appears schematically as a part of a condition control system which is substantially of the type described and claimed in the copending application to John Kriechbaum, Serial No. 432,983, filed March 2, 1942. The same reference characters are used in this figure to designate the parts as previously described.

The numeral 176 generally designates a hot air furnace which comprises the usual combustion chamber 177, air enclosure or bonnet 178 partially surrounding the combustion chamber, a draft damper 179 associated with the combustion chamber, and check damper 180 suitably carried by the stack 181 in the usual manner.

Leading from the bonnet 178 at the top of the furnace is a supply duct 182 which communicates with a space 183 to which air warmed in the bonnet is to be supplied. A circulating fan 184 having an operating motor 185 is provided for drawing air from the space 183 through a return duct 186 and forcing air through the bonnet 178 and supply duct 182 into the space 183.

Operating arms 40, 41 are shown connected to the draft and check dampers respectively by means of chains 187, 188 which may be trained over a convenient number of pulleys 189.

The numeral 190 generally designates a transformer which comprises a primary winding 191 connected to lines 192, 193 which may be supplied by any suitable source, not shown, and a secondary winding 194 for energizing the motor 52. Switch 164 controls the energization of fan motor 185, the circuit to the motor being as follows: from line 192 through a conductor 195, switch 164, a conductor 196, motor 185, and a conductor 197 back to line 193.

As previously pointed out, the switches 71, 138, 70, and 137 are connected in series forming a part of a simple circuit for energizing the motor 52, each switch serving upon the opening thereof to terminate operation of the motor and only one switch being open at any instant.

In Figure 13, for the sake of simplifying the illustration, the switches 70, 137, 71, 138 are schematically shown as being actuated by separate cams 80, 80a, 81, 81a having indentations 82, 82a, 83, 83a respectively. It will be understood that cams 80 and 80a together correspond to cam 80 of Figure 1, and that cams 81 and 81a together correspond to cam 81 of Figure 1. The circumferentially displaced relation of the switches with respect to the indentations provides the same sequence of the opening of the switches, however, as previously described, as will readily be understood.

For initiating operation of the control motor 52 to adjust shaft 37 to a position corresponding to a particular controlled condition of the furnace 176 and circulating fan 184, a plurality of circuits are provided for shunting one or more of the switches so as to cause operation of the motor 52 until the particular switch is opened which provides a position of shaft 37 corresponding to the controlled condition desired. The various shunting circuits required to initiate the movement of the control motor 52 are established by a pair of thermostatic means 198 and 199 responsive to variations in the temperature of the space 183 and furnace 176, respectively.

As shown in the drawings the thermostatic means 198 is a conventional single pole, double throw thermostat which comprises a bimetallic strip 200 to which is suitably attached a contact blade 201. The contact blade 201 carries a contact 202 which is engageable with a pair of fixed contacts 203 and 204.

As shown in the drawings, the thermostatic means 199 is a conventional bonnet thermostat comprising a helical bimetallic strip 205 which is inserted into the bonnet 178 of the furnace 176. The strip 205 actuates a rod 206 in the usual manner, the rod 206 in turn, actuating a pair of mercury switches 207 and 208. The switch 207 comprises a glass envelope 209 and two pairs of electrodes 210, 211 and 212, 213, the electrodes 210 and 212 being jointed to provide a common terminal. Each pair of electrodes may be electrically connected by a globule of mercury 214 sealed in the envelope in the usual manner. The switch 208 similarly comprises a glass envelope 215 and a globule of mercury 216 for electrically connecting a pair of electrodes 217 and 218.

As shown, the switch 207 is slightly inclined with the horizontal in which position the electrodes 212 and 213 are electrically connected, the electrodes 210 and 211 becoming electrically connected upon a rise in temperature of the bonnet 178 to a predetermined value. The switch 208 is further inclined in the same direction for the purpose of connecting its electrodes 217 and 218 at a considerably higher bonnet temperature than that at which electrodes 210 and 211 become connected. The switch 208 constitutes a limit control for preventing continued operation of the furnace at an unsafely high value, as will hereinafter appear.

In the operation of Figure 13, with the parts in their full line positions as shown, arm 40 is in the down position which provides a closed position of the draft damper 179, arm 41 is in an up position which provides an open position of the check damper 180, switch 70 is open and motor 52 is therefore stopped and fan switch 164 is open and fan motor 185 is therefore stopped.

Assuming now that the temperature in the space 183 drops below the value which the system is set to maintain, the blade 201 then moves to the left in the direction of legend C and contact 202 engages fixed contact 204 which establishes a circuit shunting switch 70 and energizing the motor 52 as follows: from secondary winding 194 through a conductor 219, terminal 93, contact piece 101, motor terminal 113, winding lead wire 115, windings 117, 116, winding lead wire 114, motor terminal 112, conductor piece 97, terminal 91, a conductor 220, contacts 204, 202, switch blade 201, strip 200, a conductor 221, terminal 156, conductor piece 155, switch 138, conductor piece 147, switch 71, conductor piece 149, switch 137, conductor piece 151, terminal 152, and a conductor 222 back to secondary winding 194. Motor 52 then operates until switch 138 is opened and the arm 40 moves to the dotted line position marked 150° in which position draft damper 179 is in its open position as indicated by the dotted lines. The arm 41 simultaneously moves to the dotted line position marked 150° in which position the check damper 180 is closed as indicated by the dotted line position. Since this operation produces but 150° of rotation of shaft 37, the leading edge of cam 172 does not engage the lever 168 to actuate the switch 164. Consequently, the fan 184 is not set into operation at this time.

The furnace 176 then operates at an increased capacity and the temperature in the bonnet rises to a point where the switch 207 is tilted by the bimetallic element 205 in a counterclockwise direction to such an extent that the electrodes 210 and 211 are electrically connected. This establishes a circuit shunting the switch 138 and energizing the motor 52. This circuit may be traced as follows: from secondary winding 194 through conductor 219, terminal 93, conductor piece 101, motor terminal 113, winding lead wire 115, motor windings 117, 116, winding lead wire 114, motor terminal 112, conductor piece 97, switch 70, conductor piece 155, terminal 157, a conductor 223, electrodes 211, 210, a conductor 224, terminal 148, conductor piece 147, switch 71, conductor piece 149, switch 137, conductor piece 151, terminal 152, and conductor 222 back to secondary winding 194. Motor 52 then operates until switch 71 is opened. During this operation, motor 52 drives arms 40 and 41 to the dotted line positions marked 180°. The draft damper 179 and check damper 180 remain substantially in their dotted line positions to which they were driven on the previous operation of the motor. This operation of motor 52 also drives the leading edge 174 of cam 172 into engagement with the lever 168 which actuates the switch 164 thereby energizing the fan motor 185 and driving the fan 184 to supply the warmed air to the space 183.

When the temperature in the space 183 has reached a predetermined value as determined by the differential of the thermostat 198, the contact 202 engages the fixed contact 203 which establishes a circuit shunting all of the switches except switch 70. This circuit energizes motor 52 and may be traced as follows: from secondary winding 194 through conductor 219, terminal 93, conductor piece 101, motor terminal 113, winding lead wire 115, motor windings 117, 116, winding lead wire 114, motor terminal 112, conductor piece 97, switch 70, conductor piece 155, terminal 156, conductor 221, strip 200, switch blade 201, contacts 202, 203, a conductor 225, terminal 153, contact piece 151, terminal 152, and conductor 222 back to secondary winding 194. Motor 52 then operates until switch 70 is opened in which position the parts again occupy their full line positions and one cycle of operation has been completed.

Assume that shaft 37 has been driven to its 180° position wherein, as previously explained, switch 71 is open, draft damper 179 is open, the check damper 180 is closed, and the circulating fan 184 is operating. Assume further that the temperature in the bonnet rises to an unsafely high value before the space thermostat has become satisfied. Under such conditions the switch 208 will be tilted by the bimetallic element 205 to a position in which the electrodes 217 and 218 are electrically connected thereby establishing an energizing circuit for motor 52 which shunts switches 138 and 71 and may be traced as follows: from secondary winding 194 through conductor 219, terminal 93, conductor piece 101, motor terminal 113, winding lead wire 115, motor windings 117, 116, winding lead wire 114, motor terminal 112, conductor piece 97, switch 70, conductor piece 155, terminal 157, conductor 223, a conductor 226, electrodes 217, 218, a conductor 227, terminal 150, contact piece 149, switch 137, contact piece 151, terminal 152, and conductor 222 back to secondary winding 194. Motor 52 then operates until switch 137 is opened. This operation of motor 52 drives arms 40 and 41 to the dotted line position marked 330° in which position the draft damper 179 is closed and check damper 180 is open, each occupying its respective full line position. The cam 172, however, is still in a position in which switch 164 is closed and the fan motor 185 continues to operate. The circulating fan 184, then, continues to supply warmed air to the space 183 until the thermostat 198 becomes satisfied and shunts all of the switches except switch 70. However, if the bonnet 178 cools before the space thermostat 198 becomes satisfied, the switch 207 then assumes the position, as shown, in which the electrodes 212 and 213 are electrically connected. This completes a circuit for energizing motor 52 which shunts switches 71 and 137 and may be traced as follows: from secondary winding 194 through conductor 219, terminal 93, conductor piece 101, motor terminal 113, winding lead wire 115, motor windings 117, 116, winding lead wire 114, motor terminal 112, conductor piece 97, switch 70, conductor piece 155, switch 138, conductor piece 147, terminal 148, conductor 224, electrodes 212, 213, a conductor 228, terminal 154, contact piece 151, terminal 152, and conductor 222 back to secondary winding 194. The motor 52 then operates until switch 70 is opened thereby restoring the system to its original condition as previously described in which the various parts occupy their full line positions as seen in Figure 13.

Assuming again that arms 40 and 41 are in their 180° position in which switch 71 is open, and assume further that the temperature of the bonnet drops before the room thermostat 198 becomes satisfied. It should be here pointed out that this condition is extremely unusual, since, with the draft damper open and the check damper closed, the furnace usually has sufficient capacity to satisfy ordinary demands. However, in such cases in which the furnace might fail to function properly as, for example, where re-fueling is neglected or the fuel supply is depleted, or other conditions in which the furnace operates at decreased capacity, it is desirable to shut off the circulating fan to prevent a circulation of cold air to the space. Under such a condition the switch 207 assumes the position, as shown, in which the electrodes 212 and 213 are electrically connected. This completes the circuit for energizing motor 52 which shunts switches 71 and 137 as traced in the preceding paragraph. Assuming that the thermostat 198 is not calling for heat, in other words, the contact 202 is not engaging the contact 204, the motor 52 will operate until the switch 70 is opened and the system is restored to its original condition as previously described.

Assume, however, that the room thermostat 198 is still calling for heat when the bonnet cools because of continuous operation of the fan 184 for too long a time, such as might be the case under extreme operating conditions as pointed out hereinabove. In such case the switch 207 shunts the switches 71 and 137 and the thermostat 198 shunts switch 70 since the contacts 202 and 204 are in engagement. The motor 52 then operates until the switch 138 is opened, which as previously described, corresponds to the 150° position of shaft 37, in which the draft damper 179 is opened, the check damper 180 is closed and the circulating fan 184 is inoperative. When the bonnet becomes sufficiently warm to close contacts 210 and 211 of the switch 207, thereby energizing the motor 52 to close the switch 164, the circulating fan will again be operated until the thermostat 198 is satisfied, thus repeating the cycle.

Assume a condition in which the air in the bonnet has been warmed to such an extent that the switch 207 is tilted to a position in which the electrodes 210 and 211 are electrically connected, and assume further that the shaft 37 is in its 0° position wherein switch 70 is open. Under such conditions, when the thermostat 198 calls for heat, engagement of contacts 202 and 204 shunts the switch 70, and since the switch 207 shunts the switch 138, the motor 52 operates directly to the 180° position in which switch 71 is opened, the switch 164 is closed, and the fan 184 operates to supply warmed air to the space 183.

From the foregoing it is obvious that I have provided a motor operator of unusual utility which is well adapted for the purposes intended. Moreover, while I have selected but two embodiments thereof as best being illustrative of the principles involved, I do not wish to be strictly limited thereto and contemplate all such alterations, additions, omissions, and substitutions as would naturally occur to those skilled in the art without departing from the spirit or scope of the invention as defined by the appended claims.

I claim as my invention:

1. A motor operator comprising a casing having a fixed portion and a portion removably secured thereto, an operating shaft journalled in part in said fixed and in part in said removable casing portion, a motor and gear train for driving said shaft, means for supporting said motor and gear train on said removable casing portion in drivable engagement with said shaft, a panel for electrical connections with said motor, and means for mounting said panel on said removable casing portion so as to be removable therewith from said fixed casing portion together with said motor and gear train.

2. A motor operator comprising a casing having a fixed portion and a portion removably secured thereto, an operating shaft, a first journal therefor in said fixed portion, a second journal therefor in said removable portion, means on said fixed and removable casing portions for providing axial alignment of said journals, a motor and gear train for driving said shaft, means for supporting said motor and gear train on said removable casing portion in drivable engagement with said shaft, a panel for electrical connections with said motor, and means for mounting said panel on said removable casing portion so as to be removable therewith from said fixed casing portion together with said motor and gear train.

3. A motor operator comprising a casing having a fixed portion and a portion removably secured thereto, an operating shaft journalled in part in said fixed and in part in said removable casing portion, a motor and gear train for driving said shaft, means for supporting said motor and gear train on said removable casing portion in drivable engagement with said shaft, a panel for electrical connections with said motor, means for mounting said panel on said removable casing portion so as to be removable therewith from said fixed casing portion together with said motor and gear train, and means on said fixed casing portion for mounting said casing to a suitable support therefor.

4. A motor operator comprising a casing having a fixed portion and a portion removably secured thereto, an operating shaft, a first journal therefor in said fixed portion, a second journal therefor in said removable portion, said operating shaft projecting outwardly of each said journal and having operating arms removably secured thereto, a motor and gear train for driving said shaft, means for supporting said motor and gear train on said removable casing portion in drivable engagement with said shaft, a panel for electrical connections with said motor, and means for mounting said panel on said removable casing portion so as to be removable therewith from said fixed casing portion together with said motor and gear train upon removal of said operating arm adjacent said journal in said fixed casing portion.

5. A motor operator comprising an electric motor and a casing therefor, said casing comprising a fixed portion, and a portion removably secured thereto, a panel for electrical connections with said motor, said panel comprising a part of the removable portion of the casing and said motor being mounted on said removable casing portion for removal therewith from said fixed casing portion, said fixed casing portion being shaped to interfittingly engage said panel when said portions are secured together so that the fixed portion together with the removable portion and panel form a complete casing for the motor operator.

6. In an electrical device, a magnetizable core, a winding comprising a number of turns of wire mounted on said core, a casing for said winding and core, a panel secured to said casing electrically connected to the end of said winding, and means abutting an end of said winding to hold the turns of wire in position on said core, said means cooperating with the end of the winding connected to said panel to prevent loosening of the turns of said winding.

7. A motor operator comprising a casing having a fixed portion and a portion removably secured thereto, an operating shaft journalled in part in said fixed and in part in said removable casing portion, a plate secured to said removable casing portion in spaced relation therewith, a motor mounted on said plate, a gear train mounted for rotation between said plate and removable casing portion in drivable relation with said motor and said shaft, and a panel for electrical connections with said motor, said panel being supported on said plate and said removable casing portion so as to be removable therewith from said fixed casing portion together with said motor and gear train.

8. A motor operator comprising a casing having a fixed portion and a portion removably secured thereto, a shaft journalled in said casing, a motor and gear train supported on said removable casing portion in drivable relation with said shaft, a panel mounted on said removable casing portion, switch means depended from said panel, means on said shaft engageable with said switch means for actuating the switch means, and circuit means including said motor, switch means, and a source of power for energizing said motor, said switch means serving upon the opening thereof to terminate operation of said motor.

9. A motor operator comprising a casing having a fixed portion and a portion removably secured thereto, a shaft journalled in said casing, a motor and gear train supported on said removable casing portion in drivable relation with said shaft, a panel mounted on said removable casing portion, switch means depended from said panel, means on said shaft engageable with said switch means for actuating the switch means, manually operable switch means carried by said panel, and circuit means including said motor, switch means, manual switch means, and a source of power for energizing said motor, said first switch means serving upon the opening thereof to terminate operation of said motor, and said manual switch means being operable to complete a circuit for initiating operation of said motor independently of said switch means.

10. In a motor operator, an electric motor, a casing therefor, a shaft journalled in said casing, driving connections between said motor and said shaft including a member secured to the shaft, said member having an integrally formed substantially cylindrical portion extended to each side thereof, said cylindrical portion having peripheral indentations formed therein, a panel secured to said casing, and a plurality of switches for controlling the energization of said motor depended from said panel and engageable with said cylindrical portions, said switches being so arranged with respect to said indentations as to be actuated in sequence thereby, each said switch serving upon the opening thereof to terminate operation of said motor.

11. A motor operator comprising a casing having a fixed portion and a portion removably secured thereto, an operating shaft journalled in part in said fixed and in part in said removable casing portion, a plate secured to said removable casing portion in spaced relation therewith, a motor mounted on said plate, driving connections between said motor and said shaft including a member secured to the shaft, said member having cam means formed integrally therewith and extended axially to each side thereof, a panel secured to said casing, a plurality of switch means depended from said panel into engagement with said cam means to be actuated thereby, each axially extended cam portion having in engagement therewith at least one of said plurality of switch means, said member being disposed between said plate and said removable casing portion, and means depended from said plate and said removable casing portion for holding said switch means in engagement with said cam means.

12. A motor operator comprising a casing having a fixed portion and a portion removably secured thereto, an operating shaft journalled in part in said fixed and in part in said removable casing portion, a plate secured to said removable casing portion in spaced relation therewith, a motor mounted on said plate, driving connections between said motor and said shaft including a member secured to the shaft, said member having cam means formed integrally therewith and extended axially to each side thereof, a panel secured to said casing, and a plurality of switch means depended from said panel into engagement with said cam means to be actuated thereby, each axially extended cam portion having in engagement therewith at least one of said plurality of switch means, said member being disposed between said plate and said removable casing portion.

WALTER E. EDELMAN.